United States Patent [19]

Tung et al.

[11] Patent Number: 4,644,049

[45] Date of Patent: Feb. 17, 1987

[54] SOLID STATE POLYMERIZATION

[75] Inventors: William C. T. Tung, Tallmadge; Paul R. Wendling, Akron, both of Ohio; James W. Brent, Jr., Huntington, W. Va.

[73] Assignee: The Goodyear Tire & Rubber Company, Akron, Ohio

[21] Appl. No.: 836,284

[22] Filed: Mar. 5, 1986

[51] Int. Cl.$^4$ ............................................. C08G 63/02
[52] U.S. Cl. ................................... 528/272; 528/274; 528/483; 528/490; 528/493; 528/494; 528/497
[58] Field of Search ............... 528/272, 483, 490, 493, 528/494, 497, 274

[56] References Cited

U.S. PATENT DOCUMENTS

| | | | |
|---|---|---|---|
| 3,960,817 | 6/1976 | Morawetz et al. | 528/272 |
| 4,064,112 | 12/1977 | Rothe et al. | 528/272 |
| 4,379,912 | 4/1983 | Lu | 528/272 X |
| 4,434,276 | 2/1984 | Horlbeck et al. | 528/272 X |
| 4,532,319 | 7/1985 | Wendling | 528/274 |

*Primary Examiner*—Lucille M. Phynes
*Attorney, Agent, or Firm*—Alvin T. Rockhill

[57] ABSTRACT

High molecular weight polyester resins are sometimes produced from low molecular weight polyester prepolymers having the same composition by solid state polymerization. Polyester prepolymers are generally converted from the amorphous state to the crystalline state prior to solid state polymerization in order to raise their sticking temperature. This is done in order to keep the polyester prepolymer from sticking together as a solid mass in the solid state polymerization reactor. Such polyester prepolymers have traditionally been crystallized by heating them to elevated temperatures. It has been found that polyester prepolymers can be crystallized by exposing them to the vapors of certain volatile organic compounds. By utilizing such vapors to crystallize polyester prepolymers the need for a thermal crystallization step can be eliminated.

The present invention specifically relates to an improved process for solid state polymerizing a polyester prepolymer into a high molecular weight polyester resin comprising (1) crystallizing said polyester prepolymer in the presence of the vapor of at least one member selected from the group consisting of volatile chlorinated hydrocarbons, volatile ketones, tetrahydrofuran, ethylene oxide, and propylene oxide; and (2) subsequently heating the crystallized polyester prepolymer to a temperature of from about 1° C. to about 50° C. below its sticking temperature for a period of time sufficient to produce a high molecular weight polyester resin.

14 Claims, No Drawings

SOLID STATE POLYMERIZATION

BACKGROUND OF THE INVENTION

High molecular weight polyesters are commonly produced from low molecular weight polyesters of the same composition by solid state polymerization. The low molecular weight polyesters which are used in such solid state polymerizations are prepared by conventional melt polymerizations. Solid state polymerization is generally considered advantageous in that the handling of high molecular weight ultra-high viscosity molten polymers during the polymerization phase is eliminated. Thermal degradation during the solid state portion of the polymerization is also essentially avoided.

In melt polymerizations, the major part of the reaction is transesterification due to the fact that thermal paralysis nullifies much of the esterification of carboxyl end groups. A much larger percentage of the reaction in a solid state polymerization is esterification. Thus, a high molecular weight can be obtained in a solid state polymerization with a lower carboxyl concentration than can be achieved in a melt polymerization.

The low molecular weight polyester prepolymers utilized in solid state polymerizations are generally in the form of pellets or chips. Such pellets can vary greatly in size; however, as a general rule, the smaller the size of the pellets of polyester prepolymer the faster the solid state polymerization with proceed. Such polyester prepolymers are generally converted from the amorphous to the crystalline state prior to solid state polymerization in order to raise their sticking temperature. This is done in order to keep the pellets or chips of polyester prepolymer from sticking together as a solid mass in the solid state polymerization reactor.

In the solid state polymerization of a polyester prepolymer the polymerization is carried out at an elevated temperature which is below the melting point of the polyester resin. Such polymerizations are normally conducted in the presence of a stream of inert gas or under a vacuum. Solid state polymerizations are normally conducted on a commercial basis in the presence of a stream of inert gas since it serves to remove volatile reaction products and helps to heat the polyester.

SUMMARY OF THE INVENTION

It has been found that the surface of polyester prepolymers can be crystallized by bringing them into contact with the vapors of certain organic compounds. These organic compounds include volatile chlorinated hydrocarbons, volatile ketones, tetrahydrofuran, ethylene oxide, and propylene oxide. By crystallizing polyester prepolymers with such vapors, the need for utilizing a traditional thermal crystallization step prior to solid state polymerization can be eliminated. Thus, the need for a prolonged energy intensive thermal crystallization step and a conventional thermal crystallizer is totally eliminated by utilizing the technique of the present invention.

The present invention more specifically reveals an improved process for solid state polymerizing a polyester prepolymer into a high molecular weight polyester resin comprising (1) crystallizing said polyester prepolymer in the presence of the vapor of at least one member selected from the group consisting of volatile chlorinated hydrocarbons, volatile ketones, tetrahydrofuran, ethylene oxide, and propylene oxide; and (2) subsequently heating the crystallized polyester prepolymer to a temperature of from about 1° C. to about 50° C. below its sticking temperature for a period of time sufficient to produce a high molecular weight polyester resin.

DETAILED DESCRIPTION OF THE INVENTION

This invention is applicable to virtually any polyester which can be solid state polymerized. The most common type of polyester which will be solid state polymerized using the technique of this invention will have at least about 75 mole percent of their acid moieties being provided by terephthalic acid and/or a naphthalinic dicarboxylic acid (preferably 2,6-) with their diol moieties being provided by glycols such as ethylene glycol, butylene glycol, 1,4-dimethylol cyclohexane and the like or aromatic diols such as hydroquinone and catechol. The polyesters can also contain other dicarboxylic acids such as adipic acid, isophthalic acid, sebacic acid, and the like. Polyethylene terephthalate (PET) and polybutylene terephthalate homopolymers are examples of polyesters that are often solid state polymerized to high molecular weights. Blends of various polyesters can also be polymerized using the process of this invention. For instance, it can be utilized in solid state polymerizing melt blends of polyethylene terephthalate and polyethylene isophthalate.

The polyester prepolymers (starting polyesters) utilized in this invention are typically prepared by melt polymerization techniques. These polyester prepolymers generally have an initial starting IV (intrinsic viscosity) of at least 0.3 dl/g in a 60:40 phenol:tetrachloroethane solvent system at a temperature of 30° C. and at a concentration of 0.4 g/dl. Preferably, the polyester prepolymers which are solid state polymerized in accordance with this invention will have an original or starting IV of from about 0.4 to about 0.7 dl/g.

In accordance with the present invention the surfaces of the polyester prepolymer particles being utilized are converted from the amorphous state to the crystalline state prior to solid state polymerization in order to raise their sticking temperature. This is done in order to keep the polyester prepolymer chips or pellets being solid state polymerized from sticking together as a solid mass in the solid state polymerization reactor. Preferably the surfaces of the polyester prepolymer particles being solid state polymerized will be at least about 20 percent crystalline. This crystallization is attained by exposing the polyester prepolymer particles to the vapors of a volatile chlorinated hydrocarbon, a volatile ketone, tetrahydrofuran, ethylene oxide, or propylene oxide. The volatile chlorinated hydrocarbons and volatile ketones which are useful in the practice of the present invention have boiling points of less than 125° C. Methylene chloride is a particularly preferred volatile chlorinated hydrocarbon with acetone being a particularly preferred volatile ketone.

The amount of time required to crystallize the surfaces of the polyester prepolymer particles being treated will vary with the concentration of the vapor, with the type of volatile organic compound being utilized, with the type of polyester prepolymer being utilized, and with the crystallinity desired. Suitable time relationships can be easily determined by observing the change in appearance of the particular polyester prepolymer as it changes from transparent to opaque as an indication of substantial crystal formation on the polyester surface. Since the vapors of the organic compound being used crystallize the polyester prepolymer from its surface inward, generally a lower degree of crystallinity is required to prevent pellets made out of the polyester prepolymer from sticking than is required when the polyester prepolymer is crystallized utilizing a thermal treatment. This is because pellets of polyester prepolymer will not stick together if their surface is crystallized even though they may be composed of amorphous material on the inside.

Although a low molecular weight polyester prepolymer may be in the form of thin film filaments, ribbons or rods, it is usually preferable to sub-divide the material by flaking, cutting or chopping it into small pieces. The polyester prepolymer utilized in the solid state polymerizations of this invention will normally be in the form of pellets or chips. Such pellets can vary greatly in size; however, as a general rule, the smaller the size of the pellets of polyester prepolymer the faster the solid state polymerization will proceed.

Polyester prepolymers can be solid state polymerized in accordance with the process of this invention in a batch or continuous process. Suitable solid state polymerization temperatures can range from a temperature just above the threshold temperature of the polymerization reaction up to a temperature within a few degrees of the sticking temperature of the prepolymer resin which can be well below its melting point. For instance, the sticking temperature of crystalline or partially crystalline polyethylene terephthalate prepolymers is about 240° C. which is much higher than their sticking temperature in the amorphous state which is typically about 100° C. to 150° C.

The solid state polymerization temperature utilized will typically be from about 1° C. to about 50° C. below the sticking temperature of the crystallized polyester prepolymer. The optimum solid state reaction temperature will differ somewhat for polymers or copolymers of different compositions and of different molecular weights. As a general rule, the optimum solid state polymerization temperature for a polyester prepolymer will be from about 5° C. to about 20° C. below its sticking temperature. For example, in the solid state polymerization of crystalline polyethylene terephthalate, the highest temperatures which can normally be employed range from 230° C. to 240° C. which is just below the sticking temperature of this polyester and about 20° C. below its melting point. Generally, the polyethylene terephthalate will be solid state polymerized at a temperature of from about 210° C. to about 245° C. In most cases, polyethylene terephthalate will be solid state polymerized at a temperature of from 220° C. to 240° C.

As the solid state polymerization of a polyester prepolymer proceeds, its sticking temperature can increase. Thus, the solid state polymerization temperature can be incrementally increased during the course of the polymerization. For example, in the case of polyethylene terephthalate the process described in U.S. Pat. No. 3,718,621, which is incorporated herein by reference in its entirety, can be utilized.

The solid state polymerization is conducted under a vacuum or in the presence of a stream of an inert gas. Normally such solid state polymerizations are conducted in the presence of an inert gas stream. It is highly desirable for the inert gas to flow uniformly throughout the solid state polymerization zone which is filled with the polyester prepolymer which is being polymerized.

In order to help insure that the inert gas flows homogeneously or uniformly through the solid state polymerization zone without bypassing certain areas in it, a device for dispersing the inert gas is generally used. Thus, a good polymerization reactor will be designed in such a way that the inert gas will flow homogeneously through the polyester prepolymer in it. It should be noted that the inert gas actually flows around the pellets or chips of polyester prepolymer as it streams through the solid state polymerization zone.

Some suitable inert gases for use in the solid state polymerization process of this invention include nitrogen, carbon dioxide, helium, argon, neon, krypton, zeon, and certain industrial waste gases. Various combinations or mixtures of different inert gases can also be used. In most cases nitrogen will be used as the inert gas.

The total amount of inert gas needed to solid state polymerize a polyester prepolymer into a high molecular weight polyester resin in a given solid state polymerization reactor at a given temperature can be greatly reduced by pulsing the inert gas through the polyester prepolymer. The minimum amount of inert gas that needs to be pulsed through a given polyester prepolymer per unit time per unit weight will vary with the polyester, the solid state polymerization temperature used, and the design of the polymerization reactor. The optimum manner of pulsing the inert gas through the polyester will also vary with the type of polyester used, the polymerization temperature used, and the design and size of the polymerization reactor. Usually, between about 0.05 and about 2 liters of inert gas per hour will be pulsed through the polyester prepolymer per kilogram of the polyester prepolymer. Generally the best way to pulse the inert gas through the polyester prepolymer being solid state polymerized is to repeatedly turn the flow of inert gas on and off. U.S. Pat. No. 4,532,319, which is incorporated herein by reference in its entirely describes this technique for reducing the consumption of inert gas in greater detail.

The polyester prepolymer will be solid state polymerized for a time sufficient to increase its molecular weight or IV to that of the high molecular weight polyester resin desired. It will be desirable for the high molecular weight polyester resin being prepared to have an IV of at least 0.65 dl/g. In most cases the high molecular weight resin will have an IV of at least 0.7 dl/g and for many applications will preferably have an IV of at least about 0.8 dl/g. The polymerization time needed will normally range from about 1 to about 36 hours and in most cases will range from 6 to 24 hours.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLES 1-5

A series of unoriented films made out of polyethylene terephthalate (PET) having an intrinsic viscosity of 0.6 which were 10 mils (0.254 mm) thick were suspended in a glass jar which contained propylene oxide vapor which was in equilibrium with air at 25° C. The PET films which were originally transparent quickly turned opaque after being exposed to the propylene oxide vapor. This indicates that surface crystallization took place very rapidly.

Samples of the PET films were withdrawn from the jar containing the propylene oxide vapor after 15 minutes, 30 minutes, 90 minutes, and 180 minutes. These film samples along with a control sample were placed in a forced air oven which was maintained at 125° F. (52° C.) for 16 hours in order to dry off any absorbed propylene oxide. The films which were treated with propylene oxide vapor all remained opaque. The density of the films was measured and is reported in Table I.

TABLE I

| Example | Exposure Time, min. | Density, dl/g |
| --- | --- | --- |
| 1 (control) | 0 | 1.341 |
| 2 | 15 | 1.352 |
| 3 | 30 | 1.353 |
| 4 | 90 | 1.357 |
| 5 | 180 | 1.359 |

As can be seen the density of the PET films increase with longer times of exposure to the propylene oxide vapor. Increasing density is an indication of increasing crystallinity. Thus, it is clear that the longer the PET film was exposed to propylene oxide vapor, the deeper the propylene oxide molecules penetrated into the film and the thicker the induced crystallinity extended into the film.

EXAMPLES 6-9

The procedure utilized in Examples 1-5 was utilized in this series of experiments except that methylene chloride was used in lieu of propylene oxide to induce crystallization. The results of this series of experiments are reported in Table II.

TABLE II

| Example | Exposure Time, min. | Density, dl/g |
| --- | --- | --- |
| 6 (control) | 0 | 1.341 |
| 7 | 15 | 1.386 |
| 8 | 30 | 1.388 |
| 9 | 90 | 1.388 |

As can be readily seen methylene chloride vapor is very effective for inducing crystallization in PET films.

EXAMPLE 10

A film which was comprised of a polyethylene terephthalate/isophthalate copolyester was suspended in a glass jar which contained acetone vapor which was in equilibrium with air at room temperature (21°–24° C.). The copolyester utilized in this experiment contained about 96 percent terephthalic acid and 4 percent isophthalic acid, based upon the total number of repeat units derived from acids in the copolyester. The film was originally transparent and turned opaque after being exposed to the acetone vapor. This experiment clearly indicates that acetone vapor can be used to induce crystallization and copolyesters which are comprised of repeat units which are derived from terephthalic acid and isophthalic acid.

EXAMPLE 11

The procedure utilized in Example 10 was repeated in this experiment except that propylene oxide was used in lieu of acetone in order to induce crystallization. In this experiment the propylene oxide vapor caused the film to turn opaque which is a clear indication that it induced crystallinity in the copolyester film which was treated.

EXAMPLE 12

The procedure utilized in Example 10 was repeated in this experiment except that tetrahydrofuran was utilized to induce crystallization instead of acetone. In this experiment the copolyester film turned opaque after being exposed to the tetrahydrofuran vapors. Thus, this experiment shows that tetrahydrofuran vapors can be utilized in order to induce crystallization in copolyesters.

EXAMPLE 13

Copolyester chips which were comprised of a polyethylene terephthalate/isophthalate copolyester which contained 98 percent terephthalic acid and 2 percent isophthalic acid, based upon total repeat units which were derived from acids, was utilized in this experiment. The copolyester of which the chips were comprised had an intrinsic viscosity of 0.6. Four ounces (113 g) of the copolyester chips were placed in a stainless steel mesh basket which was suspended in a glass jar containing methylene chloride vapor which was in equilibrium with air at 21° C. After 1 hour of exposure to the methylene chloride vapor, the chips were placed in a forced air oven which was maintained at 45° C., in order to dry off absorbed methylene chloride.

The chips were poured into a laboratory size solid state polymerization reactor. The solid state polymerization reactor utilized was essentially a glass cylinder which was 1.5 inches (3.8 cm) in diameter and 11 inches (27.9 cm) high which was equipped with a cindered glass dispersing plate. The solid state polymerization reactor was placed in a constant temperature bath which was maintained at 225° C. A preheated nitrogen stream was allowed to flow through the polyester prepolymer in the reactor at a constant rate of 4 standard cubic feet per hour. The polyester prepolymer polymerized and no sticking was observed. This experiment shows that the need to crystallize chips of polyester prepolymer can be eliminated by utilizing a vapor phase crystallization process.

EXAMPLE 14

This experiment was conducted as a control. It was carried out using the same procedure that was described for Example 13 except for the fact that the copolyester prepolymer chips were not crystallized by exposure to methylene chloride vapor. In this experiment after 30 minutes, the control chips were heavily stuck to the reactor wall and also formed many lumps. This experiment illustrates the problems that are encountered in solid state polymerizations which are conducted without first crystallizing the prepolymer chips being utilized. It is very clear that the prepolymer chips which were crystallized by methylene chloride vapors in Example 13 had a much higher sticking temperature.

EXAMPLE 15

The procedure utilized in Example 13 was repeated in this experiment except that propylene oxide was utilized instead of methylene chloride to induce crystallization. In this experiment no sticking problems were encountered. Thus, the propylene oxide used in this experiment effectively crystallized the chips of polyester prepolymer.

Variations in the present invention are possible in light of the descriptions of it provided herein. It is, therefore, to be understood that changes can be made in the particular embodiments described which will be within the full intended scope of the invention as defined by the following appended claims.

What is claimed is:

1. An improved process for solid state polymerizing a polyester prepolymer into a high molecular weight resin comprising
   (1) crystallizing said polyester prepolymer in the presence of the vapor of at least one member selected from the group consisting of volatile chlorinated hydrocarbons, volatile ketones, tetrahydrofuran, ethylene oxide, and propylene oxide; and
   (2) subsequently heating the crystallized polyester prepolymer to a temperature of from about 1° C. to about 50° C. below its sticking temperature for a period of time sufficient to produce a high molecular weight polyester resin.

2. A process as specified in claim 1 wherein said polyester prepolymer has an initial IV of at least 0.3 dl/g.

3. A process as specified in claim 2 wherein said polyester prepolymer has at least about 75 mole percent of its acid units being provided by members selected from the group consisting of terephthalic acid, isophthalic acid, and napthalene dicarboxylic acid.

4. A process as specified in claim 3 wherein said polyester prepolymer has its diol units being provided by members selected from the group consisting of ethylene glycol, butylene glycol, 1,4-dimethylol cyclohexane, hydroquinone, and catechol.

5. A process as specified in claim 2 wherein said member selected from the group consisting of volatile chlorinated hydrocarbons, volatile ketones, tetrahydrofuran, ethylene oxide, and propylene oxide is a member selected from the group consisting of methylene chloride, acetone, propylene oxide, and tetrahydrofuran.

6. A process as specified in claim 4 wherein said member selected from the group consisting of volatile chlorinated hydrocarbons, volatile ketones, tetrahydrofuran, ethylene oxide, and propylene oxide is a member selected from the group consisting of propylene oxide, methylene chloride, acetone, and tetrahydrofuran.

7. A process as specified in claim 6 wherein said polyester prepolymer has an initial IV of from about 0.4 to about 0.7 dl/g.

8. A process as specified in claim 6 wherein said temperature is from about 5° C. to about 20° C. below the sticking temperature of said polyester prepolymer.

9. A process as specified in claim 7 wherein said temperature is from about 5° C. to about 20° C. below the sticking temperature of said polyester prepolymer.

10. A process as specified in claim 8 wherein said polyester prepolymer is polyethylene terephthalate.

11. A process as specified in claim 9 wherein said polyester prepolymer is polyethylene terephthalate.

12. A process as specified in claim 8 wherein said polyester prepolymer is a polyethylene terephthalate/isophthalate copolyester.

13. A process as specified in claim 9 wherein said polyester prepolymer is a polyethylene terephthalate/isophthalate copolyester.

14. A process as specified in claim 7 wherein said polyester prepolymer is polyethylene terephthalate and wherein said elevated temperature is from about 210° C. to about 245° C.

* * * * *